Nov. 26, 1968  G. W. GREGORY  3,412,457
FABRICATED WELDMENT AND METHOD OF CONSTRUCTING
Filed Sept. 1, 1964

GEORGE W. GREGORY
INVENTOR

Huebner & Worrel
ATTORNEYS

United States Patent Office 3,412,457
Patented Nov. 26, 1968

3,412,457
FABRICATED WELDMENT AND METHOD OF CONSTRUCTING
George W. Gregory, 1243 E. Saginaw Way,
Fresno, Calif. 93704
Filed Sept. 1, 1964, Ser. No. 393,628
9 Claims. (Cl. 29—487)

ABSTRACT OF THE DISCLOSURE

A method of welding an attachment sheet to an elongated element having a conduit therethrough includes the steps of directing a controlled temperature fluid through the conduit. A heated fluid is first passed through the conduit in order to uniformly preheat the element. While the fluid continues to pass through conduit the sheet is welded to the element. The fluid is adjusted to a suitable temperature lower than the welding temperature and is continually passed through the conduit subsequent to welding for cooling the weldment.

---

Contemporary fabricated weldments incorporate sheet metal members of stock material in the range of .060" to .125", which are considered relatively thin sheets. Both ferrous and nonferrous sheet metal members are employed in the fabrication of such weldments, and localized warpage and distortion are experienced in both types of metals due to concentrated and non-uniform heating incident to welding operations. This difficulty is encountered in the fabrication of weldments in which sheets are joined to each other, as well as in construction of weldments incorporating elongated substantially rigid structural members of relatively heavy mass joined to the aforementioned relatively thin sheet members.

In welding operations conducted in an environment of varying ambient temperatures, such as those occurring throughout the diurnal range experienced in temperate zones during the winter season, the amperage of the welding apparatus must be adjusted to adapt to the rise in temperature of metal stock during a given day. Accordingly, it is highly desirable to maintain a substantially uniform temperature in the metal stock throughout the welding operations. Previously available welding apparatus and methods for joining relatively thin sheet members and structural members to form fabricated weldments have not provided this desirable uniformity of temperature throughout the welding operation. The beneficial results flowing from such maintenance of uniform temperature include a substantially constant amperage requirement at the welding electrode, consistent quality of the weld, and increased individual production by the welders.

Accordingly, it is an object of the present invention to provide a method of constructing fabricated weldments which incorporate relatively thin sheet metal members while maintaining such members at a substantially uniform temperature during welding operations.

Another object of the invention is to provide a fabricated weldment of an elongated structural metal member having a fluid conduit formed therein and joined to at least one relatively thin sheet metal member.

Another object is to provide a method of constructing such a fabricated weldment wherein a heat exchange fluid medium is passed through the conduit during welding operation so that warpage and localized distortion of the relatively thin sheet members is prevented.

A further object is to provide a weldment fabricated of an elongated structural member joined to laterally opposed sheet members, wherein the structural member is provided with a fluid conduit adapted for heat exchange purposes both during welding operations in forming the weldment, as well as subsequent to the construction of the weldment.

These, together with other objects, will become more readily apparent upon reference to the following description and accompanying drawing.

Figure 1:
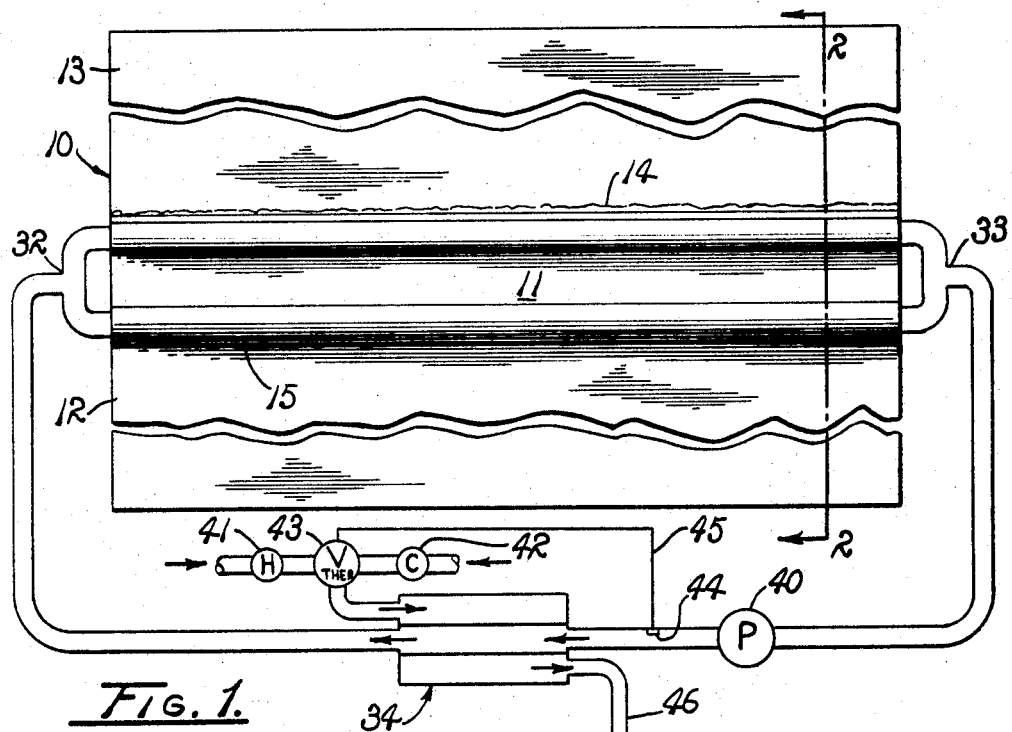
FIG. 1 is a top plan view of welding apparatus and a fabricated weldment embodying the principles of the present invention and constructed in accordance with the method thereof, wherein parts are broken away for illustrative convenience and portions of the apparatus are shown schematically.

Referring more particularly to FIG. 1, a first form of the present invention is shown at 10 as constituting a fabricated weldment. The weldment incorporates an elongated structural member 11 and first and second sheet members 12 and 13, of relatively thin sheet metal stock, when compared to the thickness of the structural member 11. As a specific example of thin sheet members 12 and 13, commercially available aluminum alloy identified as 5052–H34 of a thickness range between .060" to .125" has been joined to structural members, such as 11, formed by extruding aluminum alloy identified commercially as 6063–T5. The sheet members 12 and 13 are joined to the structural member 11 by respective weld beads 14 and 15, which constitute welded joints securing their respective sheet members to the heavier structural member 11.

Figure 2:
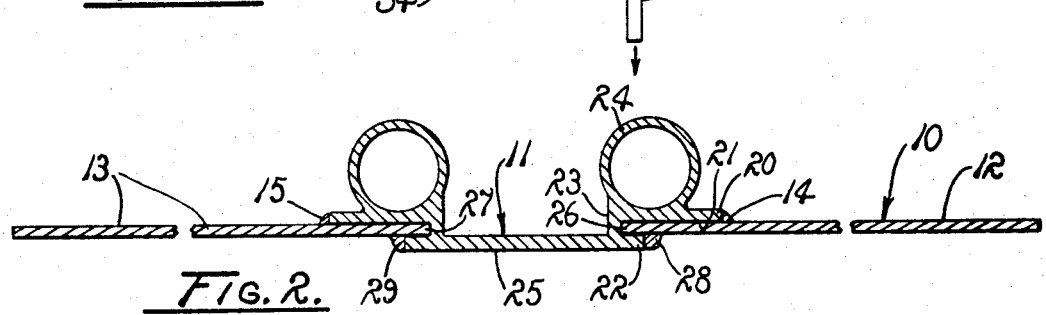
FIG. 2 is an enlarged view in vertical, transverse section taken along line 2—2 of FIG. 1.

The details of the structural member 11 are more evident by reference to FIG. 2 which illustrates a pair of laterally opposed attachment edges 20 disposed outwardly from respective contacting surfaces 21 provided on the member 11. Transversely spaced from each of the attachment edges are respective retaining lips 22 in the form of a laterally extended flange. Hollowed portions 23 which are tubular in the embodiment illustrated in FIG. 2, provide a pair of fluid conduits 24 in heat conducting relation to the attachment edges 20. In addition to serving as fluid conduits, the hollowed portions 23 also enhance the structural rigidity of the member 11, as well as the fabricated weldment, when the sheets 12 and 13 are joined thereto. An intermediate web 25 is extended between the hollowed portions 23 and provides structural continuity for the member 11.

Each of the sheets 12 and 13 are provided with respective attachment edges 26 and 27 adapted to be joined to the structural member 11 adjacent to its respective attachment edges 20. As shown in FIG. 2, the respective attachment edges of the sheet members 12 and 13 are individually received between a respective flange 22 and the attachment edge 20 and in thermally conducting relation to the contacting surface 21. Lower weld beads 28 and 29, as viewed in the position shown in FIG. 2, serve as welded joints additionally securing the sheet members 12 and 13 to the structural member 11. The fabricated weldment of the present invention has been found to be ideally suited in the construction of boats; therefore, water-tight welded joints are mandatory in the weldment to provide a satisfactory finished construction.

Referring again to FIG. 1, the structural member 11 provides opposite ends 30 and 31 which serve as suitable means for conducting a heat exchange medium in communication with the ends of the conduit 24. A branched inlet pipe 32 is connected to the end 30, while a similarly branched outlet pipe 33 is secured to the end 31. A heat exchanger 34 is in communication with both the inlet pipe 32 and the outlet pipe 33.

A pump 40 is included in the circulating system of the heat exchanger 34 to insure proper circulation of a suitable heat exchange fluid, such as water, passed through the conduit 24 by means of the inlet pipe 32 and outlet pipe 33. To maintain a desired temperature value of the fluid, a source of heating fluid 41 and a source of cooling fluid 42 are provided in communication with a thermostatically controlled valve 43. The valve permits temperature controlled heat exchange fluid to flow through the heat exchanger 34 at a temperature determined by a sensor 44 disposed in the fluid circulating system downstream from the pump 40 and operatively connected to the thermostatically controlled valve 43 by control wire 45. Consequently, heat exchange fluid is admitted to the heat exchanger 34 under the control of valve 43 and flows through a discharge pipe 46 to a suitable sump. Variations of such heat exchange apparatus, such as a suitable closed circuit system, will readily occur to those skilled in the art.

Operation

The operation of the described embodiment of the subject invention is believed to be readily apparent and is briefly summarized at this point. In the event that the stock material, such as the structural member 11 and sheet members 12 and 13 are at a relatively low temperature compared to the mean temperature experienced in the diurnal range, the heat exchange fluid admitted by valve 43 is selected to provide fluid admitted through inlet pipe 32 at a temperature level to heat the members to be joined by welding. Consequently, the welding apparatus is set at a predetermined amperage for optimum welding operations. For example, in welding relatively cold metals, a higher amperage is required for a given filler rod diameter and arc length; conversely, as the temperature of the metal stock rises, a lower amperage is required for the same filler rod. By employing apparatus equivalent to that illustrated in FIG. 1 and the method described above, a substantially uniform temperature of stock material can be regulated at the outset of the welding operations.

Upon the commencement of welding to form the welded joints 14, 15, 28, and 29, as by either a metal electrode shielded by inert gas in welding aluminum or by a tungsten electrode shielded by a suitable inert gas, the sheet members 12 and 13 normally experience concentrated heating in limited areas immediately adjacent to their attachment edges 26 and 27. Since heat exchange fluid is continuously passed through the conduit 24 by means of the pump 40, heat incident to welding operations is conducted away from the relatively thin sheet members 12 and 13, thereby preventing localized distortion and warpage which would otherwise result. By reason of this dissipation of concentrated heat in the welding area immediately adjacent to the respective attachment edges of the structural member 11 of the sheet members 12 and 13, faster rates of welding are permitted which reduce the production costs of finished weldment 10.

In addition to heat dissipation, the apparatus illustrated in FIG. 1 permits preconditioning of the members 11 to be incorporated in the weldment. Assuming that the members have been stored in a relatively cool or cold environment, a higher amperage is required than during welding operations when the members have been warmed to average temperatures existing in modern assembly shops. The initial step is to fit-up the respective attachment edges of the sheet members 12 and 13 so that the sheets are temporarily retained between the flange 22 and the attachment edge 20 of the structural member 11 and in contact with the surface 21 thereof. To maintain this fit-up position, the upper weld beads 14 and 15 are initially tack welded. The inlet and outlet pipes 32, 33 are then connected to the conduit 24 and fluid is then pumped through the structural member 11 by operation of pump 40. The thermostatic valve 43 then maintains fluid flowing through the conduit 24 at a predetermined temperature to precondition the members 11, 12 and 13 at a desired optimum temperature for uniform welding results.

Upon the commencement of welding operations to complete the beads 14, 15, 28, and 29, the heat exchange fluid flowing through the conduit 24 dissipates heat resulting from this welding as described above.

Second form

Figure 3:
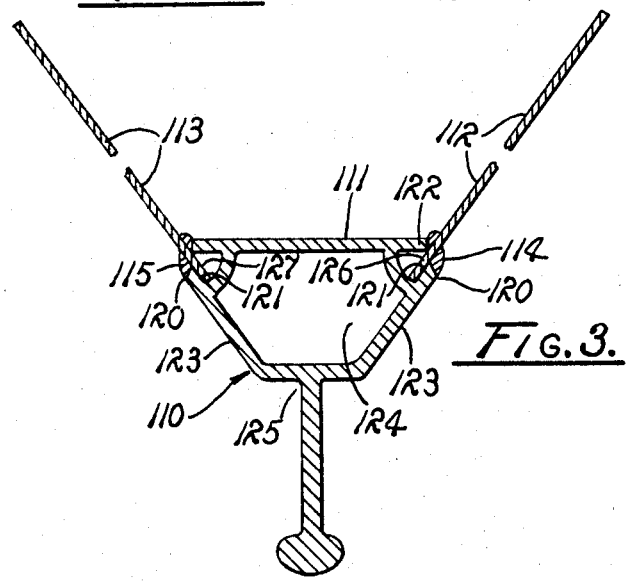
FIG. 3 is an enlarged view in vertical, transverse section similar to FIG. 2, but showing a second form of weldment as another embodiment of the invention.

A second form of the weldment of the present invention is shown in FIG. 3 and indicated at 110. In this second form, an elongated structural member 111 is joined to laterally opposed sheet members 112 and 113 by respective welding beads 114 and 115.

The structural member 111 affords laterally opposed attachment edges 120 having a contacting surface 121 immediately adjacent thereto. A retaining lip 122 is respectively transversely spaced from each attachment edge 120 to permit the reception of the sheet members 112, 113 therebetween. The angular relationship of the sheet members can be selectively varied to conform to the desired configuration of the resulting weldment. Throughout the range of permissible angular relation, the attachment edges 120 and retaining flanges 122 cooperate to maintain the sheets in contact with the structural member 111.

A hollowed portion 123 of the structural member 111 provides a single fluid conduit 124 which extends the length of the member 111. An intermediate web 125 is radially outwardly extended from the hollowed portion 123 and is in heat conducting relationship with the conduit 124. The sheet members 112, 113 each have respective attachment edges 126 and 127, which when positioned as shown in FIG. 3, are also in heat conducting relationship with the conduit 124. The intermediate web 125 is provided with a thickened distal end 128, which serves as a keel in certain forms of weldments constructed in accordance with the present invention.

The weldment shown in FIG. 3 as an embodiment of the second form of the invention is constructed in substantially the same manner as that described above in connection with the first form. The conduit 124 serves as a channel to carry heat exchange fluid therethrough, both to precondition the stock members from which the weldment 110 is to be constructed, as well as to dissipate heat resulting from the welding operations. In both forms of the invention, the method described herein permits a higher rate of welding, lowered production costs, and precludes any distortion and warpage which would otherwise result in fabricated weldments produced at the same rate. The weldment and method of constructing permits the use of commercially available alloys in the form of extrusions for the structural members 11 and 111, and relatively thin sheet stock for use as sheet members.

In both forms of the invention, the resulting weldments provide fluid conduits incorporated therein which are formed by reason of the configuration of the extrusion. This configuration is selected to provide structural rigidity to the resulting weldment, as well as providing a fluid conduit which may be utilized both during the welding operations as well as during the life of the resulting weldment. In either case, the location of the conduit in heat exchange relationship to the attachment edges of the sheet members and the large areas afforded thereby, results in excellent heat transfer between the members and the heat exchange fluid medium utilized.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A method of fabricating a weldment comprising placing an elongated reinforcing structural metal member having at least one attachment edge extended therealong and a hollowed body portion providing a fluid conduit in fluid isolation but heat conducting relationship to said attachment edge and being substantially coextensive therewith immediately adjacent to a second metal member having an attachment edge adapted for joining to the attachment edge of said structural member with said attachment edges in sufficient proximity to permit joining by welding; continuously passing a heating fluid through said conduit in substantially filling relation thereto for substantially uniformly elevating the temperatures of said conduit and said attachment edges; and joining said members by welding along said attachment edges by the external application of heat thereto while continuing to pass said fluid through the conduit.

2. A method of welding a metallic member having a conduit therethrough and a predetermined welding zone coextensively related to the conduit comprising continuously circulating a heated fluid in substantially filling relation through the conduit so that the temperature throughout said conduit and said welding zone of the member is substantially uniformly elevated, and welding said member while at said elevated temperature.

3. The method of claim 2 in which during the welding operation heat conduction outwardly therefrom through the member is minimized by continuing to circulate said fluid through the conduit at a temperature less than the temperature of the member resulting from the welding.

4. A method of joining a pair of metal sheet members having fitted attachment edges and one of which has a conduit therein coextensively related to its attachment edge comprising arranging said members with their attachment edges in heat conducting abutment, continuously circulating a heating fluid through said conduit in substantially filling relation thereto so that the temperature throughout said conduit and the attachment edges of both members is substantially uniformly elevated, and welding said attachment edges while continuing to circulate said fluid through the conduit.

5. The method of claim 4 in which during the welding operation heat conduction outwardly therefrom is minimized by said fluid circulated through the conduit being at a temperature substantially less than the temperature of the member incident to the welding.

6. The method of claim 4 in which said fluid is circulated through the conduit while the welding operation is performed to remove a portion of the heat conducted outwardly from the welding operation, and continuing to circulate said fluid through the conduit subsequent to completion of the welding operation to cool both members by removal of the heat of welding.

7. A method of welding so as to cause a minimum of distortion and improved fusion in a work means being welded comprising
    (a) pre-heating the work means by passing a fluid at a temperature above that of the work means in heat exchanging relation thereto;
    (b) welding the work means by raising the temperature thereof in a predetermined welding zone to the temperature of fusion of the work means;
    (c) continuing to pass the fluid in heat exchanging relation to the work means during the welding whereby the temperature of the work means in the welding zone is appreciably above the temperature of said fluid; and,
    (d) subsequent to the welding, cooling the work means by continuing to pass said fluid in heat exchanging relation thereto.

8. The method of claim 7 in which the fluid is passed in heat exchanging relation to the work means throughout said welding zone whereby said heating and cooling effects thereof are coextensive with said zone.

9. The method of claim 8 in which said fluid is heated at a position removed from the work means during the pre-heating of the work means and cooled at a position removed from the work means during the cooling subsequent to the welding.

References Cited

UNITED STATES PATENTS

| | | | |
|---|---|---|---|
| 1,542,753 | 6/1925 | Wiltsie | 219—118 |
| 1,612,317 | 12/1926 | Reed | 219—161 X |
| 1,973,591 | 9/1934 | Weber | 219—137 X |
| 2,369,381 | 2/1945 | Unke | 219—106 X |
| 2,457,704 | 12/1948 | Mitchell et al. | 228—46 X |
| 2,572,593 | 10/1951 | Brown | 228—46 X |
| 2,716,691 | 8/1955 | Bowman | 219—60 X |
| 2,831,957 | 4/1958 | Young | 219—124 |
| 2,107,435 | 2/1938 | Birmingham | 219—137 X |
| 2,280,150 | 4/1942 | Hasse et al. | 219—137 X |

RICHARD M. WOOD, *Primary Examiner.*

J. G. SMITH, *Assistant Examiner.*